(12) United States Patent
Mun et al.

(10) Patent No.: US 12,384,938 B2
(45) Date of Patent: Aug. 12, 2025

(54) ADHESIVE FILM AND DISPLAY MEMBER INCLUDING THE SAME

(71) Applicants: SAMSUNG SDI CO., LTD., Yongin-si (KR); SAMSUNG ELECTRONICS CO., LTD., Suwon-si (KR)

(72) Inventors: Sung Hyun Mun, Suwon-si (KR); Byeong Do Kwak, Suwon-si (KR); Il Jin Kim, Suwon-si (KR); Ji Ho Kim, Suwon-si (KR); Hyung Rang Moon, Suwon-si (KR); Gwang Hwan Lee, Suwon-si (KR); Ik Hwan Cho, Suwon-si (KR); Jae Hyun Han, Suwon-si (KR)

(73) Assignees: SAMSUNG SDI CO., LTD., Yongin-si (KR); SAMSUNG ELECTRONICS CO., LTD., Suwon-si (KR)

( * ) Notice: Subject to any disclaimer, the term of this patent is extended or adjusted under 35 U.S.C. 154(b) by 29 days.

(21) Appl. No.: 17/682,166

(22) Filed: Feb. 28, 2022

(65) Prior Publication Data
US 2022/0177732 A1    Jun. 9, 2022

Related U.S. Application Data

(63) Continuation of application No. 14/973,312, filed on Dec. 17, 2015, now Pat. No. 11,535,775.

(30) Foreign Application Priority Data

Dec. 23, 2014    (KR) .................. 10-2014-0187618
Dec. 11, 2015    (KR) .................. 10-2015-0177425

(51) Int. Cl.
| | | |
|---|---|---|
| *C09J 4/00* | (2006.01) | |
| *B32B 27/20* | (2006.01) | |
| *B32B 27/30* | (2006.01) | |
| *C09J 133/08* | (2006.01) | |

(52) U.S. Cl.
CPC .............. *C09J 4/00* (2013.01); *B32B 27/20* (2013.01); *B32B 27/308* (2013.01); *C09J 133/08* (2013.01); *C09J 2203/318* (2013.01); *C09J 2301/312* (2020.08); *C09J 2301/408* (2020.08); *C09J 2301/414* (2020.08); *C09J 2433/00* (2013.01); *C09J 2467/006* (2013.01)

(58) Field of Classification Search
None
See application file for complete search history.

(56) References Cited

U.S. PATENT DOCUMENTS

| | | | |
|---|---|---|---|
| 10,745,597 B2 | 8/2020 | Kim et al. | |
| 10,829,671 B2 | 11/2020 | Cho et al. | |
| 2007/0149715 A1 | 6/2007 | Lee et al. | |
| 2009/0298969 A1 | 12/2009 | Attarwala et al. | |
| 2012/0100359 A1 | 4/2012 | Kishioka et al. | |
| 2014/0016067 A1* | 1/2014 | Yoon ................. | C08G 18/8029 349/96 |
| 2014/0065416 A1 | 3/2014 | Niwa et al. | |
| 2014/0162044 A1 | 6/2014 | Lee et al. | |
| 2015/0064460 A1 | 3/2015 | Matsumoto et al. | |
| 2015/0367602 A1 | 12/2015 | Iwaya et al. | |
| 2016/0177147 A1 | 6/2016 | Han et al. | |
| 2017/0349791 A1 | 12/2017 | Hwan et al. | |
| 2019/0264077 A1 | 8/2019 | Park et al. | |

FOREIGN PATENT DOCUMENTS

| | | | |
|---|---|---|---|
| CN | 102753635 | A | 10/2012 |
| CN | 102933677 | A | 2/2013 |
| CN | 103160217 | A | 6/2013 |
| CN | 103865411 | A | 6/2014 |
| JP | 4750410 | B2 | 8/2011 |
| KR | 10 2007-0055363 | A | 5/2007 |
| KR | 10-2010-0002638 | A | 1/2010 |
| KR | 10-2014-0085259 | A | 7/2014 |
| KR | 10-2014-0102132 | A | 8/2014 |
| TW | 2013-00474 | A1 | 1/2013 |

OTHER PUBLICATIONS

Aldrich, "Reference: Polymer Properties", pp. 52-53. date accessed: Sep. 1, 2023 <https://www3.nd.edu/~hgao/thermal_transitions_of_homopolymers.pdf> (Year: 2023).*
Nagase America, Version 2.0, 2010 (Year: 2010) (Year: 2010).*
Korean Office Action dated May 4, 2016, in Corresponding Korean Patent Application No. 10-2015-0177425.
Korean Office Action dated Sep. 29, 2016, in Corresponding Korean Patent Application No. 10-2015-017745.
Office Action dated Apr. 5, 2017, in corresponding Chinese Patent Application No. 201510969199.3.
Taiwanese Office Action dated Oct. 17, 2016.
Provisional double patenting rejection over claims of U.S. Appl. No. 14/976,408; see Action dated Sep. 27, 2017, in parent U.S. Appl. No. 14/973,312.
Provisional double patenting rejection over claims of parent U.S. Appl. No. 14/973,312 from Action dated Mar. 5, 2018, in U.S. Appl. No. 14/976,408.

* cited by examiner

*Primary Examiner* — Cheng Yuan Huang
(74) *Attorney, Agent, or Firm* — Lee IP Law, P.C.

(57) ABSTRACT

An adhesive film and a display member, the adhesive film being formed of an adhesive composition that includes a monomer mixture comprising a hydroxyl group-containing (meth)acrylate and a comonomer, wherein the adhesive film has a recovery rate of about 40% to about 99%, the recovery rate being determined according to Method A as described herein, and wherein the adhesive film has a bubble generation area of about 0%, the bubble generation area being determined according to Method B as described herein.

3 Claims, 2 Drawing Sheets

(a)          (b)

ADHESIVE FILM AND DISPLAY MEMBER INCLUDING THE SAME

CROSS-REFERENCE TO RELATED APPLICATION

This is a continuation of U.S. patent application Ser. No. 14/973,312, now U.S. Pat. No. 11,535,775, filed on Dec. 17, 2015, which is incorporated by reference herein in its entirety.

Korean Patent Application Nos. 10-2014-0187618, filed on Dec. 23, 2014, and 10-2015-0177425, filed on Dec. 11, 2015, in the Korean Intellectual Property Office, and entitled: "Adhesive Film and Display Member Including the Same," are incorporated by reference herein in their entirety.

BACKGROUND

1. Field

Embodiments relate to an adhesive film and a display member including the same.

2. Description of the Related Art

A transparent adhesive film may be used as an adhesive film in interlayer bonding for stacking parts in an optical display or in attachment of a touchscreen of a mobile phone.

For example, a capacitive touch pad for optical displays may be attached to a window or film via an adhesive film, and may sense a change in capacitance of the window or film. An adhesive film in touch pads may be stacked between a window glass and a TSP sensor glass.

SUMMARY

Embodiments are directed to an adhesive film and a display member including the same.

The embodiments may be realized by providing an adhesive film formed of an adhesive composition that includes a monomer mixture comprising a hydroxyl group-containing (meth)acrylate and a comonomer, wherein the adhesive film has a recovery rate of about 40% to about 99%, the recovery rate being determined according to Method A as described herein, and wherein the adhesive film has a bubble generation area of about 0%, the bubble generation area being determined according to Method B as described herein.

The adhesive composition may further include nanoparticles having an average particle diameter of about 5 nm to about 400 nm.

The embodiments may be realized by providing an adhesive film including a hydroxyl group-containing (meth)acrylic copolymer formed from a monomer mixture comprising a hydroxyl group-containing (meth)acrylate and a comonomer; and nanoparticles having an average particle diameter of about 5 nm to about 400 nm, wherein the adhesive film has a haze of about 4% or less according to ASTM D1003-95 for a specimen thickness of about 100 µm.

The hydroxyl group-containing (meth)acrylic copolymer may be polymerized from a monomer mixture that includes about 5 wt % to about 40 wt % of a hydroxyl group-containing (meth)acrylate, and about 60 wt % to about 95 wt % of a co-monomer.

The nanoparticles may have a core-shell structure in which the core has a glass transition temperature of about −200° C. to about 10° C., and the shell has a glass transition temperature of about 15° C. to about 150° C.

The core may include a polyalkyl (meth)acrylate or a polysiloxane, and the shell may include a polyalkyl (meth)acrylate.

A weight ratio of the core to the shell of the nanoparticles may be about 1:1 to about 9:1

The nanoparticles may be present in an amount of about 0.1 parts by weight to about 20 parts by weight, based on 100 parts by weight of the monomer mixture.

A difference in index of refraction between the nanoparticles and the hydroxyl group-containing (meth)acrylic copolymer may be 0 to about 0.1.

The adhesive film may further include a crosslinking agent.

The adhesive film may have a glass transition temperature (Tg) of about 0° C. or less.

The adhesive film may have a storage modulus of about 10 kPa to about 1,000 kPa at −20° C. to 80° C.

The adhesive film may have a storage modulus of about 10 kPa to about 200 kPa at −20° C. to 80° C.

When the adhesive film has a thickness of about 100 µm and is then subjected to about 200% stretching, the adhesive film may have a haze of about 5% or less.

The adhesive film may have a T-peel strength of about 400 gf/in to about 4,000 gf/in, as measured at 25° C. with respect to a corona-treated polyethylene terephthalate film.

The adhesive film may have a T-peel strength of about 200 gf/in to about 3,000 gf/in, as measured at 60° C. with respect to a corona-treated polyethylene terephthalate film.

A ratio of a T-peel strength of the adhesive film having a thickness of about 100 µm at 25° C. to a T-peel strength of the adhesive film having a thickness of about 100 µm at 60° C. may be about 1:1 to about 4:1.

The adhesive film may not detach or generate bubbles after about 100,000 cycles of bending to a radius of curvature of 3 mm and then unfolding a 100 µm thick sample of the adhesive film that is attached between two 50 µm thick corona-treated PET substrates at room temperature at a rate of 30 cycles/min.

The embodiments may be realized by providing a display member including an optical film; and the adhesive film according to an embodiment, the adhesive film being attached to one or both surfaces of the optical film.

The optical film may include a touch panel, a window, a polarizing plate, a color filter, a retardation film, an elliptical polarizing film, a reflective polarizing film, an anti-reflective film, a compensation film, a brightness improving film, an alignment film, an optical diffusion film, a glass shatterproof film, a surface protective film, an OLED device barrier layers, a plastic LCD substrate, an indium tin oxide (ITO)-containing film, a fluorinated tin oxide (FTO)-containing film, an aluminum-doped zinc oxide (AZO)-containing film, a carbon nanotube (CNT)-containing film, a silver nanowire-containing film, or a graphene-containing film.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
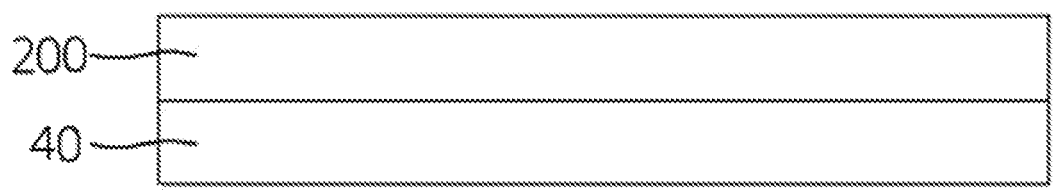
FIG. 1 illustrates a sectional view of a display member according to one embodiment.

Example embodiments will now be described more fully hereinafter with reference to the accompanying drawings;

however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, the term "(meth)acrylate" may refer to acrylates and/or methacrylates.

As used herein, the term "copolymer" may include oligomers, polymers, or resins.

As used herein, the term "co-monomer" may refer to a monomer polymerized with a monomer, e.g., a hydroxyl group-containing (meth)acrylate, and may be a suitable monomer that can be copolymerized with, e.g., a hydroxyl group-containing (meth)acrylate.

As used herein, the term "glass transition temperature of a monomer" may be measured, for example, on a homopolymer of each measurement target monomer using Discovery DSC calorimeter (TA Instrument Inc.). For example, a homopolymer of each monomer is heated to about 180° C. at a rate of about 20° C./min, followed by slowly cooling the homopolymer to about −180° C., and then heated to about 100° C. at a rate of about 10° C./min, thereby obtaining data of an endothermic transition curve. An inflection point of the endothermic transition curve is determined as the glass transition temperature.

As used herein, the term "average particle diameter" refers to a z-average particle diameter of organic particles, as measured in a water-based or organic solvent using a Zetasizer nano-ZS (Malvern Co., Ltd.).

As used herein, the term "core-shell structure" may refer to suitable core-shell structures including structures having several layers of cores or shells, and the term "outermost layer" refers to the outermost layer among the several layers.

Figure 2:
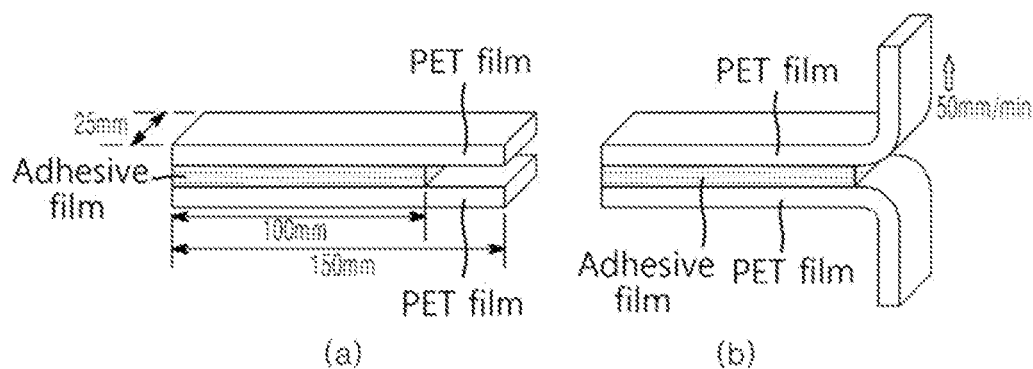
FIG. 2 illustrates a conceptual diagram of a specimen for measuring T-peel strength.

As used herein, the term "T-peel strength" may refer to a value measured by the following procedures of i) to v).

i) An adhesive composition is coated onto a polyethylene terephthalate (PET) release film, followed by UV irradiation at a dose of 2,000 mJ/cm², thereby manufacturing an about 100 μm thick adhesive sheet of an adhesive film and the PET film.

ii) A PET film, which has a size of about 150 mm×about 25 mm×about 75 μm (length×width×thickness) and is subjected to corona treatment twice (total dose: 156) under corona discharge at a dose of 78 using a corona treatment device, is prepared.

iii) An adhesive film sample having a size of about 100 mm×about 25 mm×about 100 μm (length×width×thickness) is obtained from the adhesive sheet, followed by laminating the corona-treated surfaces of the PET films to both surfaces of the adhesive film sample, thereby preparing a specimen, as shown in part (a) of FIG. 2.

iv) The specimen is subjected to autoclaving under conditions of about 3.5 bar and about 50° C. for about 1,000 seconds and secured to a TA.XT_Plus texture analyzer (Stable Micro System Co., Ltd.).

v) In the TA.XT_Plus texture analyzer, the PET film at one side is kept fixed and the PET film at the other side is pulled at a rate of about 50 mm/min, thereby measuring T-peel strength (see part (b) of FIG. 2).

Figure 3A:
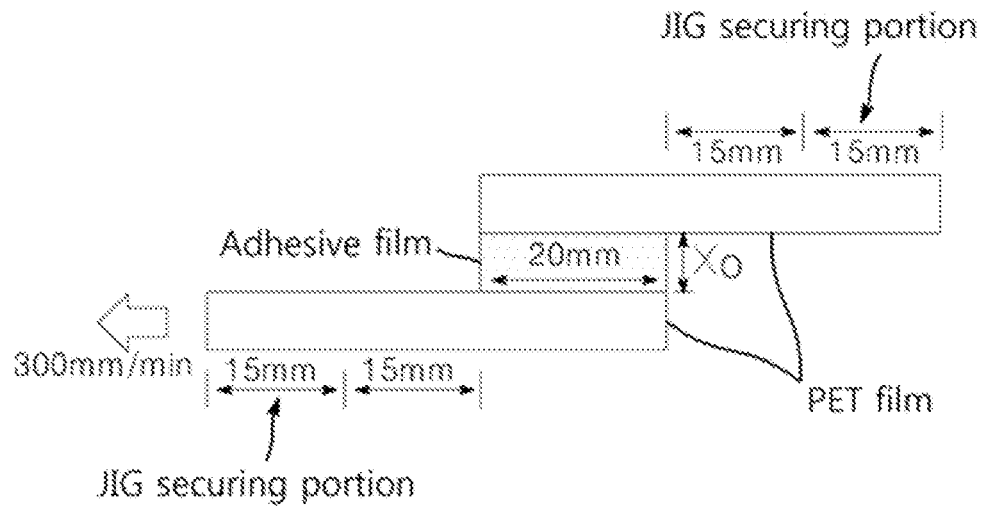
FIGS. 3A and 3B illustrate sectional and plan views of a specimen for measuring recovery rate.
Figure 3B:
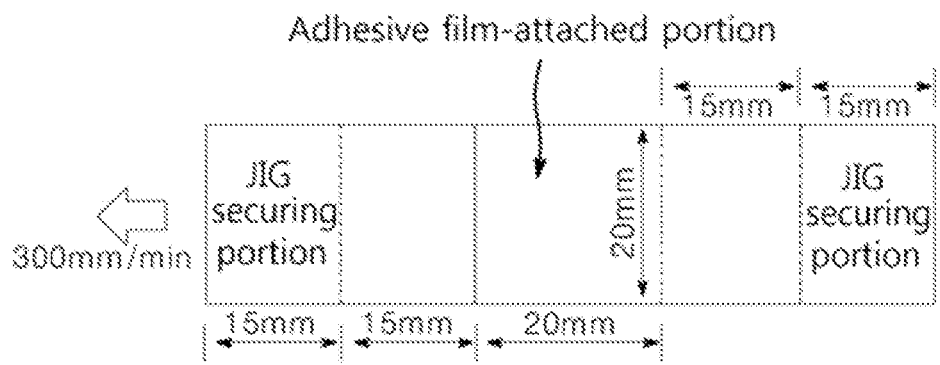

Herein, the "recovery rate" can be measured through the following procedures: When both ends of each polyethylene terephthalate (PET) film (thickness: about 75 μm) having a size of about 50 mm×about 20 mm (length×width) are defined as a first end and a second end, respectively, a specimen is prepared by bonding ends of two PET films to each other via an adhesive film having a size of about 20 mm×about 20 mm (length×width) in order of first end of first PET film/adhesive film/second end of second PET film, and has a contact area of about 20 mm×about 20 mm (length×width) between each of the PET films and the adhesive film (see FIGS. 3A and 3B). Referring to FIG. 3A, jigs are secured to non-bonded ends of the PET films of the specimen at room or ambient temperature (25° C.), respectively. Next, the jig at one side is kept fixed, and the jig at the other side is pulled as much as a length of 1,000% of thickness (unit: μm) of the adhesive film (10 times an initial thickness ($X_0$) of the adhesive film) at a rate of about 300 mm/min and then maintained for 10 seconds. Next, if an increased length of the adhesive film is defined as $X_f$ (unit: μm) when a force of 0 kPa is applied to the adhesive film by recovering the adhesive film at the same rate (about 300 mm/min) as the pulling rate, the recovery rate (%) is calculated by Equation 1.

$$\text{Recovery rate } (\%) = (1 - (X_f/X_0)) \times 100 \quad \text{[Equation 1]}$$

Here, the initial thickness of the adhesive film may range from about 20 μm to about 300 μm. Recovery rate may be measured using a TA.XT_Plus texture analyzer (Stable Micro System Co., Ltd.). Recovery rate may be measured at about 25° C. to about 80° C.

As used herein, the term "bubble generation area" refers to a value (%) measured through the following procedures: An adhesive film (length×width×thickness: about 13 cm×about 3 cm×about 100 μm) including an about 50 μm thick PET film stacked on one surface thereof and an about 100 μm thick PET film stacked on the other surface thereof is bent towards the 50 μm thick PET film such that the adhesive film has half the length, and is then placed between parallel frames having a gap of about 1 cm. Next, the adhesive film is subjected to aging at about 70° C. and about 93% RH for about 24 hours, followed by analyzing an image, which is obtained through an optical microscope (EX-51, Olympus Co., Ltd.), using Mac-View software (Mountech Co., Ltd.) to calculate a ratio of area occupied by bubbles to area of the adhesive film.

As used herein, the term "foldability test" refers to a test performed by the following procedures: An about 100 μm thick adhesive film is placed between two corona-treated about 50 μm thick PET substrates and attached to the two PET substrates through rollers, followed by aging at ambient temperature for about 12 hours. Next, the adhesive film is cut to a size of about 70 mm×about 140 mm and secured to a bending tester (CFT-200, Covotech Co., Ltd.). Next, bending a long side of the adhesive film (about 140 mm) is repeated at room temperature at a rate of 30 cycles/min such that a radius of curvature becomes 3 mm (1 cycle is defined as bending the adhesive film in half once and unfolding the adhesive film back). Then, the number of cycles causing peeling or bubble generation for the first time is measured.

According to one embodiment, an adhesive film may be formed of or prepared from an adhesive composition that includes a monomer mixture comprising a hydroxyl group-containing (meth)acrylate and a comonomer. The adhesive film may have a recovery rate of about 40% to about 99% (at a thickness of about 100 μm), as represented by Equation 1, below, and a bubble generation area of about 0%.

$$\text{Recovery rate (\%)} = (1-(X_f/X_0)) \times 100 \quad \text{[Equation 1]}$$

$X_0$ and $X_f$ are defined as follows and measured according to the following Method A.

When both ends of each of polyethylene terephthalate (PET) films (thickness: about 75 μm) having a size of about 50 mm×about 20 mm (length×width) are defined as a first end and a second end, respectively, a specimen is prepared by bonding ends of two PET films to each other via an adhesive film having a size of 20 mm×20 mm (length× width) in order of first end of first PET film/adhesive film (length×width: about 20 mm×about 20 mm)/second end of second PET film. Next, jigs are secured to non-bonded ends of the PET films of the specimen, respectively. Next, the jig at one side is kept fixed and the jig at the other side is pulled to a length of 1,000% of thickness (unit: μm) of the adhesive film (to a length of 10 times an initial thickness ($X_0$) of the adhesive film) at a rate of about 300 mm/min and then maintained for 10 seconds. When a force of 0 kPa is applied to the adhesive film by recovering the adhesive film at the same rate (300 mm/min) as the pulling rate, an increased length of the adhesive film is defined as $X_f$ (unit: μm)).

[Method for Measuring Bubble Generation Area] Method B

An adhesive film (length×width×thickness: about 13 cm×about 3 cm×about 100 μm) including an about 50 μm thick PET film stacked on one surface thereof and an about 100 μm thick PET film stacked on the other surface thereof is bent towards the about 50 μm thick PET film such that the length of the adhesive film is halved, and then placed between parallel frames having a gap of about 1 cm. Next, the adhesive film is subjected to aging under conditions of about 70° C. and about 93% RH for about 24 hours, followed by analyzing an image, which is obtained through an optical microscope (EX-51, Olympus Co., Ltd., magnification: 30×), using Mac-View software (Mountech Co., Ltd.) to calculate a ratio of area occupied by bubbles to area of the adhesive film.

The adhesive film having a thickness of about 100 μm may have a recovery rate of, e.g., about 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99%. In an implementation, the adhesive film having a thickness of about 100 μm may have a recovery rate ranging from one of the numerical values set forth above to another one of the numerical values set forth above. In an implementation, the adhesive film having a thickness of about 100 μm may have a recovery rate of about 40% to about 99%, e.g., about 50% to about 95% or about 60% to about 90%. Within this range, the adhesive film may not suffer from detachment from an adherend even though the adhesive film is subjected to repetitive folding when applied to a flexible optical display, may also have a long lifespan, and the adhesive film may facilitate change in response to flow of an adherend. The adhesive composition may have a bubble generation area of 0%, as measured by the method for measuring bubble generation area (%). Within this range, the adhesive film may exhibit excellent reliability.

According to another embodiment, the adhesive film may be formed of or prepared from an adhesive composition including a hydroxyl group-containing (meth)acrylic copolymer formed from a monomer mixture comprising a hydroxyl group-containing (meth)acrylate and a comonomer and nanoparticles having an average particle diameter of about 5 nm to about 400 nm. In an implementation, the adhesive film having a thickness of 100 μm may have a haze of about 4% or less, e.g., about 3% or less or about 2% or less. Within this range, the adhesive film may exhibit excellent transparency when used for an optical display.

Hereinafter, the adhesive composition will be described in detail.

Adhesive Composition

The adhesive composition may include a monomer mixture comprising a hydroxyl group-containing (meth)acrylate and a co-monomer.

The hydroxyl group-containing (meth)acrylic copolymer may be polymerized from a monomer mixture that includes a hydroxyl group-containing (meth)acrylate and a co-monomer.

The hydroxyl group-containing (meth)acrylate may include, e.g., a $C_1$ to $C_{20}$ alkyl group-containing (meth) acrylic acid ester having at least one hydroxyl group, a $C_5$ to $C_{20}$ cycloalkyl group-containing (meth)acrylic acid ester having at least one hydroxyl group, and/or a $C_6$ to $C_{20}$ aryl group-containing (meth)acrylic acid ester having at least one hydroxyl group.

In an implementation, the hydroxyl group-containing (meth)acrylate may include, e.g., 2-hydroxyethyl (meth) acrylate, 3-hydroxypropyl (meth)acrylate, 4-hydroxybutyl (meth)acrylate, 2-hydroxypropyl (meth)acrylate, 2-hydroxybutyl (meth)acrylate, and/or 6-hydroxyhexyl(meth) acrylate. In an implementation, the hydroxyl group-containing (meth)acrylate may include, e.g., a $C_1$ to $C_5$ alkyl group-containing (meth)acrylic monomer having a hydroxyl group, and the adhesive film may exhibit improved adhesion.

The hydroxyl group-containing (meth)acrylate may have a glass transition temperature (Tg) of about −80° C. to about −20° C., e.g., about −60° C. to about −35° C. Within this range, the adhesive film may exhibit excellent viscoelasticity at low temperature and ambient temperature.

In an implementation, the hydroxyl group-containing (meth)acrylate may be present in an amount of about 5% by weight (wt %) to about 40 wt %, e.g., about 10 wt % to about 35 wt %, in the monomer mixture. Within this range, the adhesive film may exhibit low haze and excellent adhesion.

The co-monomer may include, e.g., an alkyl (meth) acrylate monomer, an ethylene oxide-containing monomer, a propylene oxide-containing monomer, an amine group-containing monomer, an amide group-containing monomer, an alkoxy group-containing monomer, a phosphoric acid group-containing monomer, a sulfonic acid group-containing monomer, a phenyl group-containing monomer, and/or a silane group-containing monomer.

The alkyl (meth)acrylate monomer may include, e.g., an unsubstituted $C_1$ to $C_{20}$ linear or branched alkyl (meth) acrylic acid ester. In an implementation, the alkyl (meth) acrylate monomer may include, e.g., methyl (meth)acrylate, ethyl (meth)acrylate, propyl (meth)acrylate, n-butyl (meth) acrylate, t-butyl (meth)acrylate, iso-butyl (meth)acrylate, pentyl(meth)acrylate, hexyl(meth)acrylate, heptyl(meth) acrylate, ethylhexyl (meth)acrylate, octyl (meth)acrylate, isooctyl (meth)acrylate, nonyl(meth)acrylate, decyl(meth) acrylate, lauryl (meth)acrylate, and/or isobornyl (meth)acrylate. In an implementation, the alkyl (meth)acrylate monomer may be, e.g., a $C_4$ to $C_8$ alkyl (meth)acrylic monomer, and the adhesive film may have improved initial adhesion.

The ethylene oxide-containing monomer may include, e.g., an ethylene oxide group (—$CH_2CH_2O$—)-containing (meth)acrylate monomer. In an implementation, the ethylene oxide-containing monomer may include, e.g., a polyethylene oxide alkyl ether (meth)acrylate such as polyethylene oxide monomethyl ether (meth)acrylate, polyethylene oxide monoethyl ether (meth)acrylate, polyethylene oxide monopropyl ether (meth)acrylate, polyethylene oxide monobutyl ether (meth)acrylate, polyethylene oxide monopentyl ether (meth)acrylate, polyethylene oxide dimethyl ether (meth)acrylate, polyethylene oxide diethyl ether (meth)acrylate, polyethylene oxide monoisopropyl ether (meth)acrylate, polyethylene oxide monoisobutyl ether (meth)acrylate, and/or polyethylene oxide mono-tert-butyl ether (meth)acrylate.

The propylene oxide-containing monomer may include, e.g., a polypropylene oxide alkyl ether (meth)acrylate such as polypropylene oxide monomethyl ether (meth)acrylate, polypropylene oxide monoethyl ether (meth)acrylate, polypropylene oxide monopropyl ether (meth)acrylate, polypropylene oxide monobutyl ether (meth)acrylate, polypropylene oxide monopentyl ether (meth)acrylate, polypropylene oxide dimethyl ether (meth)acrylate, polypropylene oxide diethyl ether (meth)acrylate, polypropylene oxide monoisopropyl ether (meth)acrylate, polypropylene oxide monoisobutyl ether (meth)acrylate, and/or polypropylene oxide mono-tert-butyl ether (meth)acrylate.

The amino group-containing monomer may include, e.g., an amino group-containing (meth)acrylic monomer such as monomethylaminoethyl (meth)acrylate, monoethylaminoethyl (meth)acrylate, monomethylaminopropyl (meth)acrylate, monoethylaminopropyl (meth)acrylate, dimethylaminoethyl (meth)acrylate, diethylaminoethyl (meth)acrylate, N-tert-butylaminoethyl (meth)acrylate, and/or methacryloxyethyltrimethyl ammonium chloride (meth)acrylate.

The amide group-containing monomer may include, e.g., an amide group-containing (meth)acrylic monomer such as (meth)acrylamide, N-methyl acrylamide, N-methyl methacrylamide, N-methylol (meth)acrylamide, N-methoxymethyl (meth)acrylamide, N,N-methylene bis(meth)acrylamide, and/or 2-hydroxyethyl acrylamide.

The alkoxy group-containing monomer may include, e.g., a 2-methoxyethyl (meth)acrylate, 2-methoxypropyl (meth)acrylate, 2-ethoxypropyl (meth)acrylate, 2-butoxypropyl (meth)acrylate, 2-methoxypentyl(meth)acrylate, 2-ethoxypentyl(meth)acrylate, 2-butoxyhexyl(meth)acrylate, 3-methoxypentyl(meth)acrylate, 3-ethoxypentyl(meth)acrylate, and/or 3-butoxyhexyl(meth)acrylate.

The phosphoric acid group-containing monomer may include, e.g., a phosphoric acid group-containing acrylic monomer such as 2-methacryloyloxyethyldiphenylphosphate (meth)acrylate, trimethacryloyloxyethylphosphate (meth)acrylate, and/or triacryloyloxyethylphosphate (meth)acrylate.

The sulfonic acid group-containing monomer may include, e.g., a sulfonic acid group-containing acrylic monomer such as sodium sulfopropyl (meth)acrylate, sodium 2-sulfoethyl(meth)acrylate, and/or sodium 2-acrylamido-2-methylpropane sulfonate.

The phenyl group-containing monomer may include, e.g., a phenyl group-containing acrylic vinyl monomer such as p-tert-butylphenyl (meth)acrylate and/or o-biphenyl (meth)acrylate.

The silane group-containing monomer may include, e.g., silane group-containing vinyl monomer such as 2-acetoacetoxyethyl (meth)acrylate, vinyltrimethoxysilane, vinyltriethoxysilane, vinyl tris(β-methoxyethyl)silane, vinyltriacetylsilane, and/or methacryloyloxypropyltrimethoxysilane.

In an implementation, the co-monomer may be present in an amount of about 60 wt % to about 95 wt %, e.g., about 70 wt % to about 90 wt %, in the monomer mixture. Within this range, the adhesive film may exhibit excellent adhesion and reliability.

In an implementation, the co-monomer may have a glass transition temperature (Tg) of about −150° C. to about 0° C. Here, the glass transition temperature may be measured, e.g., on a homopolymer of each measurement target monomer using Discovery DSC calorimeter (TA Instrument Inc.). For example, a homopolymer of each monomer may be heated to about 180° C. at a rate of about 20° C./min, followed by slowly cooling the homopolymer to about −180° C., and then heated to about 100° C. at a rate of about 10° C./min, thereby obtaining data of an endothermic transition curve. An inflection point of the endothermic transition curve is determined as the glass transition temperature. The co-monomer having a glass transition temperature (Tg) of about −150° C. to about 0° C. may be any suitable co-monomer. In an implementation, the co-monomer may have a glass transition temperature (Tg) of about −150° C. to about −20° C., e.g., about −150° C. to about −40° C.

In an implementation, the co-monomer may include, e.g., an alkyl (meth)acrylate monomer, an ethylene oxide-containing monomer, a propylene oxide-containing monomer, an amine group-containing monomer, an amide group-containing monomer, an alkoxy group-containing monomer, a phosphoric acid group-containing monomer, a sulfonic acid group-containing monomer, a phenyl group-containing monomer, and/or a silane group-containing monomer, which may have a glass transition temperature (Tg) of about −150° C. to about 0° C.

In an implementation, the co-monomer may include, e.g., an alkyl (meth)acrylate monomer including methyl acrylate, ethyl acrylate, isopropyl acrylate, n-butyl acrylate, iso-butyl acrylate, hexyl(meth)acrylate, heptyl(meth)acrylate, 2-ethylhexyl acrylate, dodecyl (meth)acrylate, and the like; an alkylene oxide group-containing (meth)acrylate monomer including polyethylene oxide monomethyl ether (meth)acrylate, polyethylene oxide monoethyl ether (meth)acrylate, polyethylene oxide monopropyl ether (meth)acrylate, polyethylene oxide monobutyl ether (meth)acrylate, polyethylene oxide monopentyl ether (meth)acrylate, polypropylene oxide monomethyl ether (meth)acrylate, polypropylene oxide monoethyl ether (meth)acrylate, polypropylene oxide monopropyl ether (meth)acrylate, and the like; an amino group-containing (meth)acrylate monomer including monomethylaminoethyl (meth)acrylate, monoethylaminoethyl (meth)acrylate, monomethylaminopropyl (meth)acrylate, monoethylaminopropyl (meth)acrylate, and the like; an alkoxy group-containing (meth)acrylate monomer including 2-methoxyethyl (meth)acrylate, 2-methoxypropyl (meth)acrylate, 2-ethoxypropyl (meth)acrylate and the like; and/or a silane group-containing (meth)acrylate monomer including 2-acetoacetoxyethyl (meth)acrylate, vinyltrimethoxysilane, vinyltriethoxysilane, and the like.

In an implementation, the monomer mixture comprising the hydroxyl group-containing (meth)acrylate and comonomer may further include a carboxyl group-containing monomer. In an implementation, the carboxyl group-containing monomer may include, e.g., (meth)acrylic acid, 2-carboxyethyl (meth)acrylate, 3-carboxypropyl (meth)acrylate, 4-carboxybutyl (meth)acrylate, itaconic acid, crotonic acid, maleic acid, fumaric acid, and/or maleic anhydride. In an implementation, the carboxyl group-containing monomer may be present in an amount of about 10 wt % or less, e.g., about 5 wt % or less or about 1 wt % or less, in the monomer mixture. Within this range, the adhesive film may exhibit excellent adhesion and reliability.

In an implementation, the co-monomer having a glass transition temperature (Tg) of about −150° C. to about 0° C. may be present in an amount of about 60 wt % to about 95 wt %, e.g., about 70 wt % to about 90 wt %, in the monomer mixture. Within this range, the adhesive film may exhibit excellent adhesion and reliability.

The adhesive composition may further include nanoparticles. For example, the adhesive composition may include the nanoparticles, and the adhesive film may exhibit excellent low temperature and/or ambient (room) temperature viscoelasticity, and may have stable high temperature viscoelasticity and adhesion due to a crosslinked structure thereof. In an implementation, the nanoparticles may form a chemical bond to a hydroxyl group-containing (meth)acrylic copolymer.

The nanoparticles may have a specific average particle diameter and may be applied to the adhesive composition or the adhesive film. In an implementation, a difference in index of refraction between the nanoparticles and the hydroxyl group-containing (meth)acrylic copolymer may be adjusted to be small, and the adhesive composition or the adhesive film may exhibit excellent transparency despite the presence of the nanoparticles.

In an implementation, the nanoparticles may have an average particle diameter of, e.g., about 5 nm, 10 nm, 15 nm, 20 nm, 25 nm, 30 nm, 35 nm, 40 nm, 45 nm, 50 nm, 60 nm, 70 nm, 80 nm, 90 nm, 100 nm, 110 nm, 120 nm, 130 nm, 140 nm, 150 nm, 160 nm, 170 nm, 180 nm, 190 nm, 200 nm, 210 nm, 220 nm, 230 nm, 240 nm, 250 nm, 260 nm, 270 nm, 280 nm, 290 nm, 300 nm, 310 nm, 320 nm, 330 nm, 340 nm, 350 nm, 360 nm, 370 nm, 380 nm, 390 nm, or 400 nm. In an implementation, the nanoparticles may have an average particle diameter ranging from one of the numerical values set forth above to another one of the numerical values set forth above. For example, the nanoparticles may have an average particle diameter of about 5 nm to about 400 nm, about 10 nm to about 300 nm, or about 10 nm to about 200 nm. Within this range, agglomeration of the nanoparticles may be advantageously prevented and the adhesive film may exhibit excellent transparency.

In an implementation, a difference in index of refraction between the nanoparticles and the hydroxyl group-containing (meth)acrylic copolymer may be about 0.1 or less. In an implementation, the difference in index of refraction between the nanoparticles and the hydroxyl group-containing (meth)acrylic copolymer may be about 0 to about 0.05, e.g., about 0 to about 0.03. Within this range, the adhesive film exhibits excellent transparency.

In an implementation, the nanoparticles may have a core-shell structure. The core and the shell may have glass transition temperatures satisfying the following Inequality 1.

$$Tg(c) < Tg(s)$$ [Inequality 1]

Tg (c) is the glass transition temperature (° C.) of the core and Tg (s) is the glass transition temperature (° C.) of the shell.

In an implementation, the core may have a glass transition temperature of about −200° C. to about 10° C., e.g., about −150° C. to about 5° C. or about −120° C. to about 0° C. Within this range, the adhesive film may exhibit excellent low temperature and/or room temperature viscoelasticity.

In an implementation, the core may include, e.g., a polyalkyl (meth)acrylate having a glass transition temperature (Tg) of about −150° C. to about 10° C. or a polysiloxane having a glass transition temperature (Tg) of about −200° C. to about −40° C.

In an implementation, the polyalkyl (meth)acrylate having a glass transition temperature (Tg) of about −150° C. to about 10° C. may include, e.g., polymethyl acrylate, polyethyl acrylate, polypropyl acrylate, polybutyl acrylate, polyisopropyl acrylate, polyhexyl acrylate, and/or polyhexyl methacrylate. In an implementation, the polyalkyl (meth)acrylate having a glass transition temperature (Tg) of about −150° C. to about 10° C. may include, e.g., polybutyl acrylate.

In an implementation, the polysiloxane having a glass transition temperature (Tg) of about −200° C. to about −40° C. may include, e.g., an organosiloxane (co)polymer. The organosiloxane (co)polymer may include a non-crosslinked or crosslinked organosiloxane (co)polymer. The organosiloxane (co)polymer may include a crosslinked organosiloxane (co)polymer for impact resistance and pigmenting properties. In an implementation, the crosslinked organosiloxane (co)polymer may include, e.g., crosslinked dimethylsiloxane, methylphenylsiloxane, diphenylsiloxane, and/or mixtures thereof. In the organosiloxane (co)polymer, two or more organosiloxanes may be copolymerized, and the nanoparticles may be adjusted to have an index of refraction of about 1.41 to about 1.50.

A crosslinked state of the organosiloxane (co)polymer may be determined depending upon a degree of dissolution in various organic solvents. As the crosslinked state of the organosiloxane (co)polymer is intensified, a degree of dissolution thereof may become lower. A solvent for determining a crosslinked state may include, e.g., acetone, toluene, and the like. For example, the organosiloxane (co)polymer may have a moiety that is not dissolved in acetone or toluene. The organosiloxane copolymer may include, e.g., about 30 wt % or more of insolubles in toluene.

In an implementation, the organosiloxane (co)polymer may further include an alkyl acrylate crosslinked polymer. The alkyl acrylate crosslinked polymer may include, e.g., methyl acrylate, ethyl acrylate, n-butyl acrylate, 2-ethylhexyl acrylate, or the like. For example, the alkyl acrylate crosslinked polymer may include n-butyl acrylate or 2-ethylhexyl acrylate having a low glass transition temperature.

In an implementation, the shell may have a glass transition temperature of about 15° C. to about 150° C., e.g., about 20° C. to about 150° C. or about 50° C. to about 140° C. Within this range, the adhesive film may exhibit excellent durability at high temperature.

In an implementation, the shell may include, e.g., a polyalkyl (meth)acrylate having a glass transition temperature of about 15° C. to about 150° C. In an implementation, the shell may include, e.g., polymethyl methacrylate (PMMA), polyethyl methacrylate, polypropyl methacrylate, polybutyl methacrylate, polyisopropyl methacrylate, polyisobutyl methacrylate, and/or polycyclohexyl methacrylate. In an implementation, the shell may include, e.g., polymethylmethacrylate.

In an implementation, the shell may include, e.g., two or more layers. For example, an outermost layer of the nanoparticles may include a polyalkyl (meth)acrylate having a glass transition temperature of about 15° C. to about 150° C.

In an implementation, the nanoparticles included in the adhesive composition may be used in a state of being polymerized with the monomer mixture in preparation of the hydroxyl group-containing (meth)acrylic copolymer. In this case, the nanoparticles may be used in a state of being included in the hydroxyl group-containing (meth)acrylic copolymer.

In an implementation, the adhesive composition may include the prepared hydroxyl group-containing (meth) acrylic copolymer and the nanoparticles. In this case, the nanoparticles may be included in the adhesive composition separately from the hydroxyl group-containing (meth) acrylic copolymer.

The nanoparticles may be present in an amount of, e.g., about 0.1 parts by weight, 0.2 parts by weight, 0.3 parts by weight, 0.4 parts by weight, 0.5 parts by weight, 0.6 parts by weight, 0.7 parts by weight, 0.8 parts by weight, 0.9 parts by weight, 1 part by weight, 2 parts by weight, 3 parts by weight, 4 parts by weight, 5 parts by weight, 6 parts by weight, 7 parts by weight, 8 parts by weight, 9 parts by weight, 10 parts by weight, 11 parts by weight, 12 parts by weight, 13 parts by weight, 14 parts by weight, 15 parts by weight, 16 parts by weight, 17 parts by weight, 18 parts by weight, 19 parts by weight, or 20 parts by weight, based on 100 parts by weight of the monomer mixture comprising the hydroxyl group-containing (meth)acrylate and the comonomer. In an implementation, the nanoparticles may be present in an amount ranging from one of the numerical values set forth above to another one of the numerical values set forth above based on 100 parts by weight of the monomer mixture comprising the hydroxyl group-containing (meth)acrylate and the comonomer. For example, the nanoparticles may be present in an amount of about 0.1 parts by weight to about 20 parts by weight, about 0.5 parts by weight to about 15 parts by weight, or about 0.5 parts by weight to about 10 parts by weight. Within this range, the adhesive film may exhibit a good balance between viscoelasticity, storage modulus, and recovery rate.

In an implementation, a weight ratio of the core to the shell of the nanoparticles may be about 1:1 to about 9:1, e.g., about 1:1 to about 8:1 or about 1.5:1 to about 8:1. Within this range, viscoelasticity of the adhesive film may be maintained in a wide temperature range, and the adhesive film may have excellent compatibility and recovery rate.

In an implementation, the adhesive composition may further include at least one of an initiator and a silane coupling agent.

In an implementation, the initiator may include a photopolymerization initiator and/or a thermal polymerization initiator. In an implementation, the initiator may include a photopolymerization initiator, e.g., a radical photopolymerization initiator. The initiator may include an initiator which is the same as or different from the initiator used in the preparation of the hydroxyl group-containing (meth)acrylic copolymer. In an implementation, the initiator may be a thermal polymerization initiator.

The photopolymerization initiator may include a suitable initiator that can realize a second crosslinking structure by deriving polymerization of the radical polymerizable compound during curing through light irradiation. For example, the photopolymerization initiator may include benzoin, hydroxyl ketone, amino ketone, phosphine oxide photoinitiators, and the like. In an implementation, the photopolymerization initiator may include benzoin, benzoin methyl ether, benzoin ethyl ether, benzoin isopropyl ether, benzoin n-butyl ether, benzoin isobutyl ether, acetophenone, dimethylamino acetophenone, 2,2-dimethoxy-2-phenylacetophenone, 2,2-diethoxy-2-phenylacetophenone, 2-hydroxy-2-methyl-1-phenylpropan-1-one, 1-hydroxycyclohexyl phenyl ketone, 2-methyl-1-[4-(methylthio)phenyl]-2-morpholino-propan-1-one, 4-(2-hydroxyethoxy)phenyl-2-(hydroxy-2-propyl)ketone, benzophenone, p-phenylbenzophenone, 4,4'-bis(diethyl)aminobenzophenone, dichlorobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal, p-dimethylaminobenzoic acid ester, oligo[2-hydroxy-2-methyl-1-[4-(1-methylvinyl)phenyl]propanone], and/or 2,4,6-trimethylbenzoyl-diphenyl-phosphine oxide. These photopolymerization initiators may be used alone or in combination thereof.

The thermal polymerization initiator may include a suitable initiator that can realize a second crosslinking structure by deriving polymerization. For example, the thermal polymerization initiator may include azo, peroxide and redox compounds. Examples of the azo compound may include 2,2-azobis(2-methylbutyronitrile), 2,2-azobis(isobutyronitrile), 2,2-azobis(2,4-dimethylvaleronitrile), 2,2-azobis-2-hydroxymethylpropionitrile, dimethyl-2,2-methylazobis(2-methylpropionate), and 2,2-azobis(4-methoxy-2,4-dimethylvaleronitrile). Examples of the peroxide compound may include: inorganic peroxides such as potassium perchlorate, ammonium persulfate and hydrogen peroxide; and organic peroxides such as diacyl peroxide, peroxydicarbonate, peroxyester, tetramethylbutyl peroxyneodecanoate, bis(4-butylcyclohexyl) peroxydicarbonate, di(2-ethylhexyl) peroxycarbonate, butyl peroxyneodecanoate, dipropyl peroxydicarbonate, diisopropyl peroxydicarbonate, diethoxyethyl peroxydicarbonate, diethoxyhexyl peroxydicarbonate, hexyl peroxydicarbonate, dimethoxybutyl peroxydicarbonate, bis(3-methoxy-3-methoxybutyl) peroxydicarbonate, dibutyl peroxydicarbonate, dicetyl peroxydicarbonate, dimyristyl peroxydicarbonate, 1,1,3,3-tetramethylbutyl peroxypivalate, hexyl peroxypivalate, butyl peroxypivalate, trimethylhexanoyl peroxide, dimethyl hydroxybutyl peroxyneodecanoate, amyl peroxyneodecanoate, t-butyl peroxy neoheptanoate, amyl peroxypivalate, t-butyl peroxypivalate, t-amyl peroxy-2-ethylhexanoate, lauroyl peroxide, dilauroyl peroxide, di(dodecanoyl) peroxide, benzoyl peroxide, and dibenzoyl peroxide. Examples of the redox compound may include mixtures of a peroxide compound and a reductant. These azo, peroxide and redox compounds may be used alone or in combination thereof.

In an implementation, the initiator may be present in an amount of about 0.001 parts by weight to about 5 parts by weight, e.g., about 0.003 parts by weight to about 3 parts by weight or about 0.1 parts by weight to about 1 part by weight, based on 100 parts by weight of the monomer mixture comprising the hydroxyl group-containing (meth) acrylate and the comonomer. Within this range, curing may be completely performed, deterioration in transmittance of the adhesive film due to the residual initiator may be prevented, bubble generation under severe conditions may be prevented, and the adhesive composition may have excellent reactivity.

The silane coupling agent may include, e.g., a siloxane and/or an epoxy silane coupling agent. The silane coupling agent may be present in an amount of about 0.01 parts by weight to about 5 parts by weight, e.g., about 0.01 parts by weight to about 2 parts by weight or about 0.01 parts by weight to about 0.5 parts by weight, based on 100 parts by weight of the monomer mixture comprising the hydroxyl group-containing (meth)acrylate and the comonomer. Within this range, the adhesive film may exhibit improved reliability.

In an implementation, the adhesive composition may further include a crosslinking agent.

The crosslinking agent may be a polyfunctional (meth) acrylate. Examples of the polyfunctional (meth)acrylate may include: bifunctional acrylates such as 1,4-butanediol di(meth)acrylate, 1,6-hexanediol di(meth)acrylate, neopentylglycol di(meth)acrylate, polyethylene glycol di(meth)acrylate, neopentylglycol adipate di(meth)acrylate, dicyclopentanyl di(meth)acrylate, caprolactone-modified dicyclopentenyl di(meth)acrylate, ethylene oxide-modified di(meth)acrylate, di(meth)acryloxyethyl isocyanurate, allylated cyclohexyl di(meth)acrylate, tricyclodecane dimethanol di(meth)acrylate, dimethylol dicyclopentane di(meth)acrylate, ethylene oxide-modified hexahydrophthalic acid di(meth)acrylate, neopentylglycol-modified trimethylpropane di(meth)acrylate, adamantane di(meth)acrylate, 9,9-bis[4-(2-acryloyloxyethoxy)phenyl]fluorine and the like; trifunctional acrylates such as trimethylolpropane tri(meth)acrylate, dipentaerythritol tri(meth)acrylate, propionic acid-modified dipentaerythritol tri(meth)acrylate, pentaerythritol tri(meth) acrylate, propylene oxide-modified trimethylolpropane tri (meth)acrylate, trifunctional urethane (meth)acrylates, tris (meth)acryloxyethylisocyanurate and the like; tetrafunctional acrylates such as diglycerin tetra(meth)acrylate, pentaerythritol tetra(meth)acrylate and the like; pentafunctional acrylates such as dipentaerythritol penta(meth) acrylate and the like; hexafunctional acrylates such as dipentaerythritol hexa(meth)acrylate, caprolactone-modified dipentaerythritol hexa(meth)acrylate, and urethane (meth)acrylates (for example, reaction products of an isocyanate monomer and trimethylolpropane tri(meth)acrylate). These crosslinking agents may be used alone or in combination thereof. In an implementation, the crosslinking agent may be a polyfunctional (meth)acrylate of a polyhydric alcohol containing 2 to 20 hydroxyl groups to provide excellent durability to the adhesive film.

The crosslinking agent may be present in an amount of about 0.01 parts by weight to about 5 parts by weight, e.g., about 0.03 parts by weight to about 3 parts by weight or about 0.1 parts by weight to about 0.3 parts by weight, based on 100 parts by weight of the monomer mixture comprising the hydroxyl group-containing (meth)acrylate and the comonomer. Within this range, the adhesive film may exhibit excellent adhesion and improved reliability.

In an implementation, the adhesive composition may further include a suitable additive, e.g., curing accelerators, ionic liquids, lithium salts, inorganic fillers, softeners, antioxidants, anti-aging agents, stabilizers, adhesion-imparting resins, modified resins (polyol, phenol, acrylic, polyester, polyolefin, epoxy, epoxidized polybutadiene resins, and the like), leveling agents, defoamers, plasticizers, dyes, pigments (coloring pigments, extender pigments, and the like), treating agents, UV blocking agents, fluorescent whitening agents, dispersants, heat stabilizers, photostabilizers, UV absorbers, antistatic agents, lubricants, solvents, or the like.

In an implementation, the adhesive composition may further include a non-curable compound.

In an implementation, the adhesive composition may not include a solvent and may have a viscosity at 25° C. of about 300 cPs to about 50,000 cPs. The adhesive composition may not include a solvent, and the adhesive composition may have improvement in reliability by reducing bubble generation. Within this range of viscosity, the adhesive composition may have excellent coatability and thickness uniformity.

Adhesive Film

The adhesive film may be formed of or prepared from the adhesive composition as set forth above. For example, a hydroxyl group-containing (meth)acrylic copolymer may be prepared by polymerizing a mixture including: a monomer mixture, which includes a hydroxyl group-containing (meth) acrylate, a comonomer (for example, a comonomer having a glass transition temperature (Tg) of about −150° C. to about 0° C.), and/or a carboxyl group-containing monomer; and/or nanoparticles. In an implementation, the hydroxyl group-containing (meth)acrylic copolymer may be prepared by mixing the monomer mixture, which includes the hydroxyl group-containing (meth)acrylate, the co-monomer (for example, co-monomer having a glass transition temperature (Tg) of about −150° C. to about 0° C.) and/or the carboxyl group-containing monomer; and/or the nanoparticles and a radical photopolymerization initiator, followed by performing solution polymerization, suspension polymerization, photopolymerization, bulk polymerization, or emulsion polymerization.

For example, the adhesive composition may be prepared by adding an initiator to the monomer mixture to prepare a syrup including a hydroxyl group-containing (meth)acrylic copolymer (prepolymer) through partial polymerization, followed by introducing nanoparticles, an initiator and/or a crosslinking agent to the syrup. In an implementation, an initiator may be added to a monomer mixture including a hydroxyl group-containing (meth)acrylate, a comonomer (for example, a comonomer having a glass transition temperature (Tg) of about −150° C. to about −20° C.) and nanoparticles, followed by performing partial polymerization, thereby preparing a syrup including a hydroxyl group-containing (meth)acrylic copolymer (prepolymer). An initiator and/or a crosslinking agent may then be mixed with the syrup, thereby preparing the adhesive composition.

Partial polymerization may be performed such that the prepolymer has a viscosity at 25° C. of about 5,000 cPs or less, e.g., about 300 cPs to about 5,000 cPs.

The partial polymerized hydroxyl group-containing (meth)acrylic copolymer may have a weight average molecular weight of about 500,000 g/mol to about 3,000,000 g/mol, e.g., about 1,000,000 g/mol to about 2,800,000 g/mol. Within this range, durability of the adhesive film may be improved.

The adhesive film may be manufactured by coating the adhesive composition, followed by UV curing.

Curing may be performed by irradiation at a wavelength of about 300 nm to about 400 nm at a dose of about 400 mJ/cm$^2$ to about 30,000 mJ/cm$^2$ under oxygen-free conditions using a low-pressure lamp. For example, the coated adhesive composition may be cured at a dose of about 1,000 mJ/cm$^2$ to about 20,000 mJ/cm$^2$.

For example, the adhesive composition, which is prepared by mixing and partially polymerizing the monomer mixture comprising a hydroxyl group-containing (meth)acrylate and a comonomer, the nanoparticles, and a photopolymerization initiator to prepare a syrup, followed by adding an additional photopolymerization initiator to the syrup, may be coated onto a release film, followed by curing, thereby manufacturing the adhesive film. Curing may be performed by irradiation at a wavelength of about 300 nm to about 400 nm at a dose of about 400 mJ/cm$^2$ to about 3000 mJ/cm$^2$ under oxygen-free conditions using a low-pressure lamp. A coating thickness of the adhesive composition may range from about 10 μm to about 2 mm, e.g., from about 20 μm to about 1.5 mm.

The adhesive film may have a glass transition temperature (Tg) of about 0° C. or less, e.g., about −150° C. to about 0° C., about −150° C. to about −10° C., or about −150° C. to about −20° C. Within this range, the adhesive film exhibits excellent viscoelasticity at low temperature and room temperature.

In an implementation, the adhesive film may have a storage modulus at −20° C. to 80° C. of, e.g., about 10 kPa, 20 kPa, 30 kPa, 40 kPa, 50 kPa, 60 kPa, 70 kPa, 80 kPa, 90 kPa, 100 kPa, 110 kPa, 120 kPa, 130 kPa, 140 kPa, 150 kPa, 160 kPa, 170 kPa, 180 kPa, 190 kPa, 200 kPa, 210 kPa, 220 kPa, 230 kPa, 240 kPa, 250 kPa, 260 kPa, 270 kPa, 280 kPa, 290 kPa, 300 kPa, 310 kPa, 320 kPa, 330 kPa, 340 kPa, 350 kPa, 360 kPa, 370 kPa, 380 kPa, 390 kPa, 400 kPa, 410 kPa, 420 kPa, 430 kPa, 440 kPa, 450 kPa, 460 kPa, 470 kPa, 480 kPa, 490 kPa, 500 kPa, 510 kPa, 520 kPa, 530 kPa, 540 kPa, 550 kPa, 560 kPa, 570 kPa, 580 kPa, 590 kPa, 600 kPa, 610 kPa, 620 kPa, 630 kPa, 640 kPa, 650 kPa, 660 kPa, 670 kPa, 680 kPa, 690 kPa, 700 kPa, 710 kPa, 720 kPa, 730 kPa, 740 kPa, 750 kPa, 760 kPa, 770 kPa, 780 kPa, 790 kPa, 800 kPa, 810 kPa, 820 kPa, 830 kPa, 840 kPa, 850 kPa, 860 kPa, 870 kPa, 880 kPa, 890 kPa, 900 kPa, 910 kPa, 920 kPa, 930 kPa, 940 kPa, 950 kPa, 960 kPa, 970 kPa, 980 kPa, 990 kPa, or 1,000 kPa. In an implementation, the adhesive film may have a storage modulus at −20° C. to 80° C. ranging from one of the numerical values set forth above to another one of the numerical values set forth above. For example, the adhesive film may have a storage modulus at −20° C. of about 10 kPa to about 1,000 kPa, about 15 kPa to about 500 kPa, or about 20 kPa to about 200 kPa. Within this range, the adhesive film may exhibit viscoelasticity at low temperature and excellent recovery rate. In an implementation, the adhesive film may have a storage modulus at 25° C. of about 10 kPa to about 1,000 kPa, e.g. about 15 kPa to about 500 kPa or about 20 kPa to about 150 kPa. Within this range, the adhesive film may exhibit viscoelasticity at room temperature and excellent recovery rate. In an implementation, the adhesive film may have a storage modulus at 80° C. of about 10 kPa to about 1,000 kPa, e.g. about 10 kPa to about 200 kPa or about 15 kPa to about 100 kPa. Within this range, the adhesive film may exhibit viscoelasticity at high temperature and excellent recovery rate. The adhesive film may have a storage modulus of about 10 kPa to about 1,000 kPa, e.g., about 10 kPa to about 500 kPa or about 10 kPa to about 200 kPa at a temperature of −20° C. to 80° C. as well as at −20° C., 25° C. and 80° C. as set forth above.

To help improve peel strength of the adhesive film, a surface onto which the adhesive composition is coated may be subjected to surface treatment in advance. For example, corona pretreatment may be performed by treating a surface of an adherend (for example, a PET film) twice at a dose of 78 using a corona treatment device (Now plasma Co., Ltd.).

The adhesive film having a thickness of 100 μm may have a T-peel strength of, e.g., about 400 gf/in, 500 gf/in, 600 gf/in, 700 gf/in, 800 gf/in, 900 gf/in, 1,000 gf/in, 1,100 gf/in, 1,200 gf/in, 1,300 gf/in, 1,400 gf/in, 1,500 gf/in, 1,600 gf/in, 1,700 gf/in, 1,800 gf/in, 1,900 gf/in, 2,000 gf/in, 2,100 gf/in, 2,200 gf/in, 2,300 gf/in, 2,400 gf/in, 2,500 gf/in, 2,600 gf/in, 2,700 gf/in, 2,800 gf/in, 2,900 gf/in, 3,000 gf/in, 3,100 gf/in, 3,200 gf/in, 3,300 gf/in, 3,400 gf/in, 3,500 gf/in, 3,600 gf/in, 3,700 gf/in, 3,800 gf/in, 3,900 gf/in, or 4,000 gf/in, as measured at 25° C. with respect to a corona-treated polyethylene terephthalate (PET) film. In an implementation, the adhesive film having a thickness of 100 μm may have a T-peel strength ranging from one of the numerical values set forth above to another one of the numerical values set forth above, as measured at 25° C. with respect to a corona-treated polyethylene terephthalate (PET) film. For example, the adhesive film having a thickness of 100 μm may have a T-peel strength of about 400 gf/in to about 4,000 gf/in, about 500 gf/in to about 3,700 gf/in, or about 700 gf/in to about 3,500 gf/in, as measured at 25° C. with respect to a corona-treated polyethylene terephthalate (PET) film. Within this range, the adhesive film may exhibit excellent adhesion and reliability at room temperature, and may withstand an increase in the number of cycles of a foldability test.

The adhesive film having a thickness of 100 μm may have a T-peel strength of, e.g., about 200 gf/in, 300 gf/in, 400 gf/in, 500 gf/in, 600 gf/in, 700 gf/in, 800 gf/in, 900 gf/in, 1,000 gf/in, 1,100 gf/in, 1,200 gf/in, 1,300 gf/in, 1,400 gf/in, 1,500 gf/in, 1,600 gf/in, 1,700 gf/in, 1,800 gf/in, 1,900 gf/in, 2,000 gf/in, 2,100 gf/in, 2,200 gf/in, 2,300 gf/in, 2,400 gf/in, 2,500 gf/in, 2,600 gf/in, 2,700 gf/in, 2,800 gf/in, 2,900 gf/in, or 3,000 gf/in, as measured at 60° C. with respect to a corona-treated polyethylene terephthalate (PET) film. In an implementation, the adhesive film having a thickness of 100 μm may have a T-peel strength ranging from one of the numerical values set forth above to another one of the numerical values set forth above, as measured at 60° C. with respect to a corona-treated polyethylene terephthalate (PET) film. For example, the adhesive film may have a T-peel strength of about 200 gf/in to about 3,000 gf/in, about 500 gf/in to about 2,000 gf/in, or about 500 gf/in to about 1,500 gf/in, as measured at 60° C. with respect to a corona-treated polyethylene terephthalate (PET) film. Within this range, the adhesive film may exhibit excellent adhesion and reliability even when having a curved shape at high temperatures, and may withstand an increase in the number of cycles of a foldability test.

The T-peel strength of the adhesive film is measured as follows. A specimen is prepared by laminating corona-pretreated surfaces of PET films having a size of about 150 mm×about 25 mm×about 75 μm (length×width×thickness) to both surfaces of the adhesive film having a size of about 100 mm×about 25 mm×about 100 μm (length×width×thickness). Next, the specimen is subjected to autoclaving under conditions of about 3.5 bar and about 50° C. for about 1,000 seconds and then secured to a TA.XT_Plus texture analyzer (Stable Micro System Co., Ltd.). At 25° C. or 60° C., the PET film at one side is kept fixed and the PET film at the other side is pulled at a rate of 50 mm/min, thereby measuring T-peel strength of the adhesive film with respect to the PET film. Corona pretreatment of the PET film may be performed, e.g., by treating the PET film twice (total dose: 156) under corona discharge at a dose of 78 using a corona treatment device (Now plasma Co., Ltd.).

A ratio of T-peel strength at 25° C. to T-peel strength at 60° C. of the adhesive film having a thickness of about 100 μm may be, e.g., about 1.0:1, 1.1:1, 1.2:1, 1.3:1, 1.4:1, 1.5:1, 1.6:1, 1.7:1, 1.8:1, 1.9:1, 2.0:1, 2.1:1, 2.2:1, 2.3:1, 2.4:1, 2.5:1, 2.6:1, 2.7:1, 2.8:1, 2.9:1, 3.0:1, 3.1:1, 3.2:1, 3.3:1, 3.4:1, 3.5:1, 3.6:1, 3.7:1, 3.8:1, 3.9:1, or 4.0:1. In an implementation, the ratio of T-peel strength at 25° C. to T-peel strength at 60° C. of the adhesive film having a thickness of about 100 μm may range from one of the numerical values set forth above to another one of the numerical values set forth above. For example, the ratio of T-peel strength at 25° C. to T-peel strength at 60° C. of the adhesive film having a thickness of about 100 μm may range from about 1:1 to about 4:1 or about 1:1 to about 3:1. Within this range, the adhesive film may have good reliability due to excellent T-peel strength thereof in a wide temperature range.

The adhesive film may include the nanoparticles, and may have excellent low temperature and/or room temperature viscoelasticity and may exhibit stable high temperature viscoelasticity and high temperature adhesion due to a crosslinked structure thereof. In an implementation, the nanoparticles having a specific average particle diameter may be applied to the adhesive film, and a difference in index of refraction between the nanoparticles and the hydroxyl group-containing (meth)acrylic copolymer may be adjusted to be small, e.g., may be minimized, and the adhesive film may have excellent transparency despite including the nanoparticles. Therefore, the adhesive film may maintain viscoelasticity in a wide temperature range, and the adhesive film may exhibit excellent foldability and transparency and may be used for flexible optical members.

In an implementation, the adhesive film having a thickness of about 100 μm may have a haze of about 5% or less, e.g., about 3% or less or about 2% or less, as measured after the adhesive film is subjected to 200% stretching. Within this range, the adhesive film may exhibit excellent transparency when used for displays.

A number of cycles after which the adhesive film still does not to suffer from detachment or bubble generation in a foldability test may be about 100,000 cycles or more, e.g., about 150,000 cycles or more or about 200,000 cycles or more. In the foldability test, detachment means that the adhesive film is peeled off an adherend, and creation of no bubbles means that the adhesive film has a bubble generation area of 0%. Within this range, the adhesive film may be used for flexible displays, and the displays have long lifespan.

In an implementation, the adhesive film may have a thickness (excluding a release film) of about 1 μm to about 2.0 mm, e.g., about 20 μm to about 1.0 mm or about 25 μm to about 1.0 mm. Within this range, the adhesive film may be used for optical displays.

Display Member

Another embodiment relates to a display member.

The display member may include an optical film and the aforementioned adhesive film attached to one or both surfaces of the optical film.

FIG. 1 illustrates a sectional view of a display member according to one embodiment.

Referring to FIG. 1, a display member may include an optical film 40 and an adhesive film 200 attached to one or both surfaces of the optical film 40.

The adhesive film 200 may be an adhesive layer attached to one or both surfaces of optical films, and may be used in attaching glass, substrates, electrodes of touch panels, LCD/OLED modules, touch panels, optical films, or the like to each other.

Examples of the optical film 40 may include touch panels, windows, polarizing plates, color filters, retardation films, elliptical polarizing films, reflective polarizing films, anti-reflective films, compensation films, brightness improving films, alignment films, optical diffusion films, glass shatterproof films, surface protective films, OLED device barrier layers, plastic LCD substrates, indium tin oxide (ITO)-containing films, fluorinated tin oxide (FTO)-containing films, aluminum-doped zinc oxide (AZO)-containing films, carbon nanotube (CNT)-containing films, silver (Ag) nanowire-containing films, graphene-containing films, and the like.

For example, a touch panel may be attached to a window or an optical film via the adhesive film, thereby forming a display member. In an implementation, the adhesive film may be applied to polarizing plates. For example, a display may include a capacitive mobile phone as an optical display.

In an implementation, the display member may be a display member in which a first adhesive film, a touch functional unit, a second adhesive film and a window film are sequentially stacked on an optical device.

The optical device may include an OLED, an LED or a light source, and the first or second adhesive film may be the adhesive film according to an embodiment. The touch functional unit may be a touch panel.

In an implementation, the window film may be formed of an optically transparent and flexible resin. For example, the window film may include a base layer and a hard coating layer.

The base layer may be formed of at least one of polyester resins such as polyethylene terephthalate polyethylene naphthalate, polybutylene terephthalate and polybutylene naphthalate; polycarbonate resins; polyimide resins; polystyrene resins; and poly(meth)acrylate resins such as polymethyl methacrylate.

In an implementation, the hard coating layer may have a pencil hardness of about 6H or harder and may be formed of, e.g., a siloxane resin.

In an implementation, the display member may include: a liquid crystal panel in which a polarizer is stacked on both surfaces of an LCD cell; a double-sided adhesive tape (DAT) bonding functional films (for example, anti-reflective films) to each other; and a touch panel unit formed on the functional films. The touch panel unit may include: a first adhesive film; a first transparent electrode film stacked on the first adhesive film; a second adhesive film; and a second transparent electrode film. An electrode and an overcoating layer for the electrode may be formed on the second transparent electrode film, and a third adhesive film and a window glass may be stacked on the overcoating layer in order. An air gap may be removed upon lamination.

Hereinafter, the embodiments will be explained in more detail with reference to some examples. It should be understood that these examples are provided for illustration only and are not to be construed in any way as limiting.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

EXAMPLE (A) Monomer Mixture
  (a1) 2-ethylhexyl acrylate (EHA) was used.
  (a2) 4-hydroxybutyl acrylate (HBA) was used.
(B) Nanoparticles
  (b1) a core-shell structure composed of a core of polybutyl acrylate (PBA) and a shell of polymethylmethacrylate (PMMA), and had a weight ratio of the core to the shell of 1.5:1, an average particle diameter of 230 nm and an index of refraction ($N_B$) of 1.48, were used.
  (b2) a core-shell structure composed of a core of poly2-ethylhexyl acrylate (PEHA) and a shell of polymethylmethacrylate (PMMA), and had a weight ratio of the core to the shell of 2.33:1, an average particle diameter of 140 nm and an index of refraction ($N_B$) of 1.48, were used.
  (b3) 99.5 g of a dimethylsiloxane-diphenylsiloxane crosslinked copolymer, which had an index of refraction of 1.43 and an average particle diameter of 170 nm and included 41 wt % of toluene insolubles, 127.2 g of n-butyl acrylate, and 2.4 g of triallyl isocyanurate were mixed at ambient temperature, followed by preparing a silicone mixture in which 1.4 g of sodium dodecylbenzenesulfate was dispersed in 760 g of deionized water. 2.4 g of potassium sulfate was introduced to the liquid mixture while the liquid mixture was maintained at 75° C., thereby performing polymerization for 4 hours. Next, 0.7 g of potassium sulfate was additionally introduced to the liquid mixture, followed by performing dropwise addition of a solution, in which 64.8 g of methyl methacrylate and 7.25 g of methyl acrylate were mixed, to the liquid mixture for 15 minutes. Next, the components were reacted for 4 hours and then cooled to ambient temperature (reaction conversion: 97.4%). The final reaction solution and an aqueous solution of 1.5% $MgSO_4$ were mixed at 75° C., followed by washing and drying, thereby preparing nanoparticles and confirming the presence thereof. The prepared nanoparticles had an index of refraction ($N_B$) of 1.45, an average particle diameter of 173 nm, and a weight ratio of core to shell of 2.36:1.

(C) Radical Photopolymerization Initiator
  (c1) Irgacure 651 (2,2-dimethoxy-2-phenylacetophenone, BASF Co., Ltd.) was used as a radical photopolymerization initiator.
  (c2) Irgacure 184 (1-hydroxycyclohexyl phenyl ketone, BASF Co., Ltd.) was used as a radical photopolymerization initiator.
(D) Crosslinking agent: 1,6-hexanediol diacrylate (HDDA, SK cytec Co., Ltd.)
(E) Silane coupling agent: 3-glycidoxypropylmethyldiethoxysilane (KBM-403, Shin-Etsu Chemical Co., Ltd.) was used.

Example 1

4 parts by weight of (b1) nanoparticles and 0.005 parts by weight of (c1) a photopolymerization initiator (Irgacure 651) were sufficiently mixed with 100 parts by weight of a monomer mixture, which included 80 wt % of (a1) 2-ethylhexyl acrylate and 20 wt % of (a2) 4-hydroxybutyl acrylate, in a glass container. Dissolved oxygen in the glass container was purged using nitrogen gas, followed by partially polymerizing the mixture through UV irradiation using a low-pressure lamp (BL lamp, Samkyo Co., Ltd., 50 mW/cm$^2$, wavelength: 350 nm), thereby obtaining a syrup (viscosity: 2,000 cPs) comprising a partially polymerized hydroxyl group-containing (meth)acrylic copolymer, nanoparticles and a not-polymerized monomer mixture. Here, the hydroxyl group-containing (meth)acrylic copolymer had an index of refraction ($N_A$) of 1.48.

0.35 parts by weight of (c2) an additional photopolymerization initiator (Irgacure 184), 0.01 parts by weight of HDDA as (D) a crosslinking agent and 0.1 parts by weight of KBM-403 as (E) a silane coupling agent were added to the syrup, thereby preparing an adhesive composition.

The prepared adhesive composition was coated onto a polyethylene terephthalate (PET) release film (thickness: 50 μm), thereby forming a 100 μm thick adhesive film. An upper side of the adhesive film was covered with a 75 μm thick release film, followed by irradiating both surfaces of the adhesive film with light for 6 minutes using a low-pressure lamp (BL lamp, Samkyo Co., Ltd., 50 mW/cm$^2$, wavelength: 350 nm), thereby obtaining a transparent adhesive sheet. The adhesive film had a glass transition temperature (Tg) of −45° C.

Examples 2 to 9 and Comparative Example 1

A transparent adhesive sheet was manufactured in the same manner as in Example 1 except that an amount of each of the components in Example 1 was modified as listed in Table 1.

The transparent adhesive sheets prepared in Examples and Comparative Example were evaluated as to the properties as listed in Table 1. Results are shown in Table 1.

Evaluation of Properties (1) Glass transition temperature of an adhesive film (Tg, ° C.): A 15 mg (on 6 mm Al Pan) specimen was prepared from each of the adhesive films of the Examples and the Comparative Example. The specimen was heated to 180° C. at a heating rate of 20° C./min under a nitrogen atmosphere (50 mL/min), followed by cooling to −100° C. (first heating condition (1st run)). Next, while the specimen was heated to 100° C. at a heating rate of 10° C./min, a glass transition temperature (Tg) of the specimen was measured using Discovery DSC calorimeter (TA Instrument Inc.).

(2) Recovery rate: Recovery rate was measured through the following procedures. When both ends of each polyethylene terephthalate (PET) film (thickness: 75 μm) having a size of 50 mm×20 mm (length×width) were defined as a first end and a second end, respectively, a specimen was prepared by bonding ends of two PET films to each other via each of the adhesive films, which were prepared in the Examples and Comparative Example and had a size of 20 mm×20 mm (length×width), in order of first end of first PET film/ adhesive film/second end of second PET film, and had a contact area of 20 mm×20 mm (length×width) between each of the PET films and the adhesive film (see FIGS. 3A and 3B). Referring to FIG. 3A, jigs were secured to non-bonded ends of the PET films of the specimen at room temperature (25° C.), respectively. Next, the jig at one side was kept fixed, and the jig at the other side was pulled to a length of 1,000% of thickness (unit: μm) of the adhesive film (e.g., to a length of 10 times an initial thickness ($X_0$) of the adhesive film) at a rate of 300 mm/min and then maintained for 10 seconds. Next, an increased length of the adhesive film was defined as $X_f$ (unit: μm) when a force of 0 kPa was applied to the adhesive film by recovering the adhesive film at the same rate (300 mm/min) as the pulling rate, and recovery rate (%) was calculated by Equation 1.

Recovery rate (%)=(1−($X_f/X_0$))×100    [Equation 1]

(3) Bubble generation area (%): An adhesive film (length× width×thickness: 13 cm×3 cm×100 μm) including a 50 μm thick PET film stacked on one surface thereof and a 100 μm thick PET film stacked on the other surface thereof was bent towards the 50 μm thick PET such that the adhesive film had half the length, and then placed between parallel frames having a gap of about 1 cm. Next, the adhesive film was subjected to aging under conditions of 70° C. and 93% RH for 24 hours, followed by analyzing an image, which was obtained through an optical microscope (EX-51, Olympus Co., Ltd.), using Mac-View software (Mountech Co., Ltd.) to calculate a ratio of area occupied by bubbles to area of the adhesive film.

(4) T-peel strength: A PET film having a size of 150 mm×25 mm×75 (length×width×thickness)×width×thickness) was subjected to corona treatment twice (total dose: 156) at a dose of 78 using a corona treatment device. An adhesive film sample having a size of 100 mm×25 mm×100 μm (length×width×thickness) was obtained from each of the adhesive sheets of the Examples and Comparative Example. Corona-treated surfaces of the PET films were laminated to both surfaces of the adhesive film sample, thereby preparing a specimen as shown in part (a) of FIG. 2. The specimen was subjected to autoclaving at a pressure of 3.5 bar at 50° C. for 1,000 seconds and secured to a TA.XT_Plus texture analyzer (Stable Micro System Co., Ltd.). Referring to part (b) of FIG. 2, the PET film at one side was kept fixed and the PET film at the other side was pulled at a rate of 50 mm/min at 25° C. using a TA.XT_Plus texture analyzer, thereby measuring T-peel strength at 25° C. (see part (b) of FIG. 2).

In addition, the PET film at one side was kept fixed and the PET film at the other side was pulled at a rate of 50 mm/min at 65° C. using a TA.XT_Plus texture analyzer, thereby measuring T-peel strength at 60° C.

(5) Storage modulus: Viscoelasticity was measured at a shear rate of 1 rad/sec at a strain of 1% under auto strain conditions using ARES (MCR-501, Anton Paar Co., Ltd.) which was a dynamic viscoelasticity instrument. After removal of a release film, an adhesive film was stacked to a thickness of 500 μm. Next, the stacked body was subjected to punching using an 8 mm diameter puncher, thereby preparing a specimen. Storage modulus was measured on the specimen at a temperature of −60° C. to 90° C. at a heating rate of 5° C./min using an 8 mm jig, and storage modulus at each of −20° C., 25° C., and 80° C. was recorded.

placed on a lower side of the sample and a release film was placed on an upper side of the sample, followed by bonding the sample to the glass plate through 2 kg rollers, thereby preparing a stretched specimen. Next, the release film was removed from the upper side, followed by measuring haze in the same manner as described above.

(8) Index of refraction: Index of refraction was measured using a multi-wavelength Abbe refractometer (DR-M2, ATAGO Co., Ltd.).

(9) Foldability test: A 100 μm thick adhesive film was placed between 50 μm thick corona-treated PET substrates and attached to the PET substrates through rollers, followed by aging at room temperature for 12 hours. Next, the adhesive film was cut to a size of 70 mm×140 mm and secured to a bending tester (CFT-200, Covotech Co., Ltd.) using an adhesive (4965, Tesa Co., Ltd.). Next, bending a long side of the adhesive film (140 mm) was repeated (100,000 cycles) at ambient temperature at a rate of 30 cycles/min such that a radius of curvature became 3 mm (here, 1 cycle being defined as bending the adhesive film in half once and unfolding the adhesive film). After 100,000 cycles, the adhesive film suffering from peeling or bubbles was rated as X and the adhesive film not suffering from peeling and bubbles was rated as O.

TABLE 1

| | | | | | | Example | | | | | | Comparative Example |
|---|---|---|---|---|---|---|---|---|---|---|---|---|
| | | 1 | 2 | 3 | 4 | 5 | 6 | 7 | 8 | 9 | | 1 |
| (A) | (a1) | 80 | 80 | 80 | 80 | 80 | 70 | 80 | 60 | 60 | | 70 |
| | (a2) | 20 | 20 | 20 | 20 | 20 | 30 | 20 | 40 | 40 | | 30 |
| (B) | (b1) ($N_B$: 1.48) | 4 | 4 | 4 | 4 | 4 | 4 | — | — | — | | — |
| | (b2) ($N_B$: 1.48) | — | — | — | — | — | — | 4 | — | — | | — |
| | (b3) ($N_B$: 1.45) | — | — | — | — | — | — | — | 2.5 | 10 | | — |
| (C) | (c1) | 0.005 | 0.005 | 0.005 | 0.005 | 0.005 | 0.005 | 0.005 | 0.005 | 0.005 | | 0.005 |
| | (c2) | 0.35 | 0.35 | 0.35 | 0.35 | 0.35 | 0.35 | 0.35 | 0.35 | 0.35 | | 0.35 |
| (D) | | 0.01 | 0.03 | 0.05 | 0.1 | 0.5 | — | — | — | — | | — |
| (E) | | 0.1 | 0.1 | 0.1 | 0.1 | 0.1 | — | — | 0.1 | 0.1 | | — |
| $N_A$ | | 1.48 | 1.48 | 1.48 | 1.48 | 1.48 | 1.47 | 1.48 | 1.44 | 1.44 | | 1.47 |
| $|N_A-N_B|$ | | 0 | 0 | 0 | 0 | 0 | 0.01 | 0 | 0.01 | 0.01 | | — |
| Tg of adhesive film (° C.) | | −45 | −45 | −45 | −45 | −45 | −41 | −45 | −36.8 | −39.8 | | −38 |
| Recovery rate (%) | | 64 | 66 | 69 | 78 | 85 | 79.5 | 49.1 | 47.1 | 78.2 | | 38.4 |
| Bubble generation area (%) | | 0 | 0 | 0 | 0 | 0 | 0 | 0 | 0 | 0 | | 2.19 |
| T-peel strength (gf/in) | 25° C. | 1380 | 1090 | 1257 | 1238 | 1150 | 990 | 881 | 692 | 1067 | | 483 |
| | 60° C. | 725 | 676 | 703 | 764 | 755 | 536 | 654 | 382 | 731 | | 472 |
| Storage modulus (KPa) | −20° C. | 50 | 51 | 51 | 52 | 53 | 130 | 61 | 129 | 211 | | 86 |
| | 25° C. | 26 | 26 | 27 | 27 | 29 | 34 | 28 | 42 | 66 | | 22 |
| | 80° C. | 16 | 17 | 17 | 19 | 38 | 18 | 18 | 32 | 57 | | 6 |
| Haze (%) | | 0.49 | 0.46 | 0.46 | 0.44 | 0.49 | 0.78 | 0.44 | 0.95 | 1.12 | | 0.45 |
| Haze after 200% stretching (%) | | 0.48 | 0.46 | 0.47 | 0.44 | 0.48 | 0.97 | 0.45 | 1.08 | 1.28 | | 0.47 |
| Foldability test (100,000 cycles) | | O | O | O | O | O | O | O | O | O | | X |

(6) Haze: A haze meter (NDH 5000, Nippon Denshoku Co., Ltd.) was used. Haze was measured on a specimen having a thickness of 100 μm in accordance with American Society for Testing and Measurement (ASTM) D1003-95 (Standard Test for Haze and Luminous Transmittance of Transparent Plastic).

(7) Haze after 200% stretching: Both ends of a sample (5 cm×5 cm, thickness: 100 μm) of the manufactured adhesive film were secured to both sides of a horizontal tensile tester, followed by removing release films from both surfaces of the sample. After the sample was subjected to 200% stretching in a longitudinal direction (to a length twice an initial length thereof, e.g., a length of 10 cm), a glass plate was In Table 1, $N_A$ is an index of refraction of a hydroxyl group-containing (meth)acrylic copolymer in Examples 1 to 9 and Comparative Example 1; $N_B$ is an index of refraction of nanoparticles; and $|N_A-N_B|$ is a difference in index of refraction between the nanoparticles and the hydroxyl group-containing (meth)acrylic copolymer.

As shown in Table 1, it may be seen that the adhesive films of Examples 1 to 9 exhibited excellent recovery rate, adhesion, and foldability, maintained viscoelasticity in a wide temperature range, and had low haze (e.g., high transparency) as well as exhibited excellent reliability since the adhesive films of Examples 1 to 9 did not suffer from bubbles even under severe conditions.

On the other hand, the adhesive film of Comparative Example 1 exhibited unsatisfactory properties in terms of recovery rate, bubble generation area, and the like.

By way of summation and review, a transparent adhesive film may help improve clarity of a screen as compared with double-sided tapes, and may exhibit good adhesion while acting like glass by transmitting 97% or more of light. The transparent adhesive film may be used for, e.g., tablet PCs, TVs and the like including a middle or large-sized display screen as well as for mobile phones.

With severer environments of using, storing, and/or manufacturing optical displays, and with an increasing interest in wearable optical displays and the like, the transparent adhesive film may exhibit various properties. For example, for application to flexible displays, the transparent adhesive film may maintain viscoelasticity in a wide temperature range and may also exhibit excellent recoverability.

The embodiments may provide an adhesive film, which exhibits excellent properties in terms of reliability under severe conditions, recoverability, and foldability while maintaining viscoelasticity in a wide temperature range.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An adhesive film formed of an adhesive composition that includes a monomer mixture, the monomer mixture comprising:
   a hydroxyl group-containing mono(meth)acrylate, the hydroxyl group-containing mono(meth)acrylate including:
   2-hydroxyethyl(meth)acrylate, 3-hydroxypropyl (meth)acrylate, 4-hydroxybutyl(meth)acrylate, 2-hydroxypropyl(meth)acrylate, 2-hydroxybutyl(meth)acrylate, and/or 6-hydroxyhexyl(meth)acrylate, and
   a comonomer, the comonomer including:
   methyl acrylate, ethyl acrylate, isopropyl acrylate, n-butyl acrylate, iso-butyl acrylate, hexyl(meth)acrylate, heptyl(meth)acrylate, 2-ethylhexyl acrylate, dodecyl(meth)acrylate, polyethylene oxide monomethyl ether (meth)acrylate, polyethylene oxide monoethyl ether (meth)acrylate, polyethylene oxide monopropyl ether (meth)acrylate, polyethylene oxide monobutyl ether (meth)acrylate, polyethylene oxide monopentyl ether (meth)acrylate, polypropylene oxide monomethyl ether (meth)acrylate, polypropylene oxide monoethyl ether (meth)acrylate, polypropylene oxide monopropyl ether (meth)acrylate, monomethylaminoethyl (meth)acrylate, monoethylaminoethyl(meth)acrylate, monomethylaminopropyl (meth)acrylate, monoethylaminopropyl (meth)acrylate, 2-methoxyethyl(meth)acrylate, 2-methoxypropyl(meth)acrylate, 2-ethoxypropyl (meth)acrylate, 2-acetoacetoxyethyl (meth)acrylate, vinyltrimethoxysilane, and/or vinyltriethoxysilane, the comonomer having a glass transition temperature (Tg) of about −150° C. to about 0° C.,
   wherein the adhesive film has a recovery rate of about 40% to about 99%, the recovery rate being determined according to Method A as described herein,
   wherein the adhesive film has a bubble generation area of about 0%, the bubble generation area being determined according to Method B as described herein, and
   wherein the adhesive film has a storage modulus after curing of about 10 kPa to about 1,000 kPa at an entire temperature range of −20° C. to 80° C.

2. The adhesive film as claimed in claim 1, wherein the monomer mixture includes 5 wt % to 40 wt % of the hydroxyl group-containing mono(meth)acrylate and 60 wt % to 95 wt % of the co-monomer.

3. The adhesive film as claimed in claim 1, wherein the adhesive composition further includes nanoparticles having an average particle diameter of about 5 nm to about 400 nm.

* * * * *